Sept. 16, 1941.  J. A. LA BILLE  2,256,052
VELOCIPEDE
Filed Dec. 20, 1939
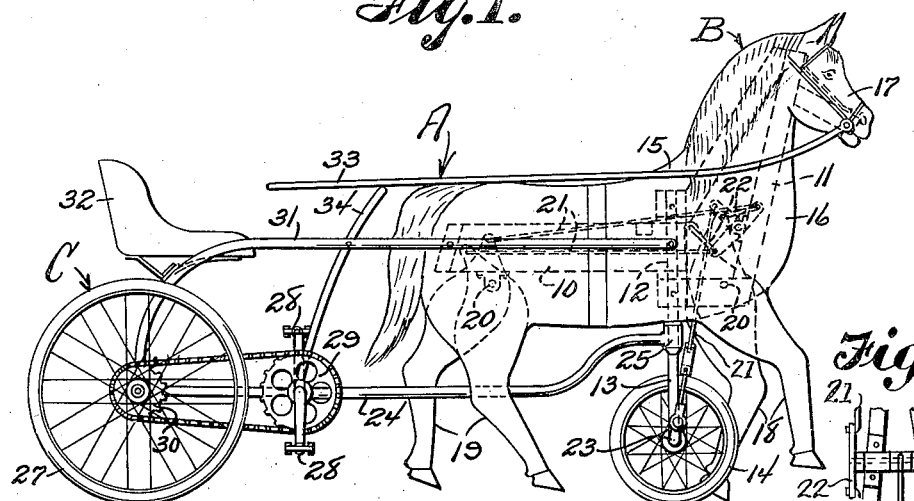
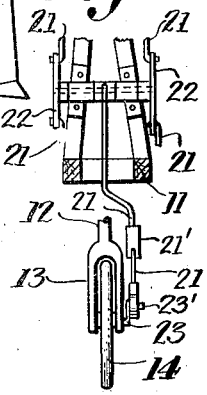
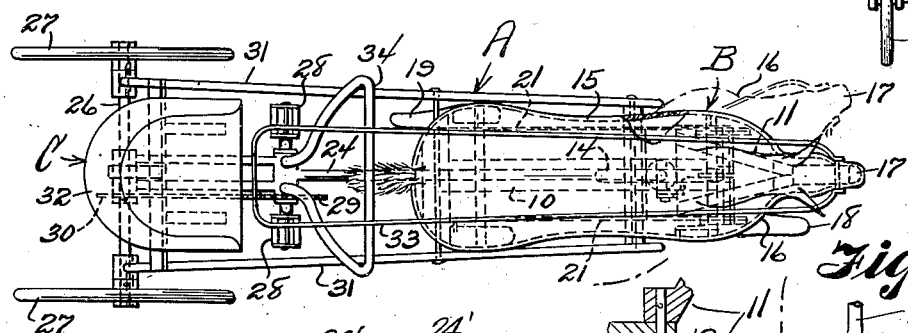
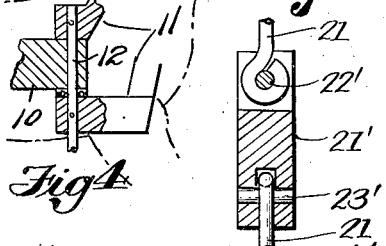
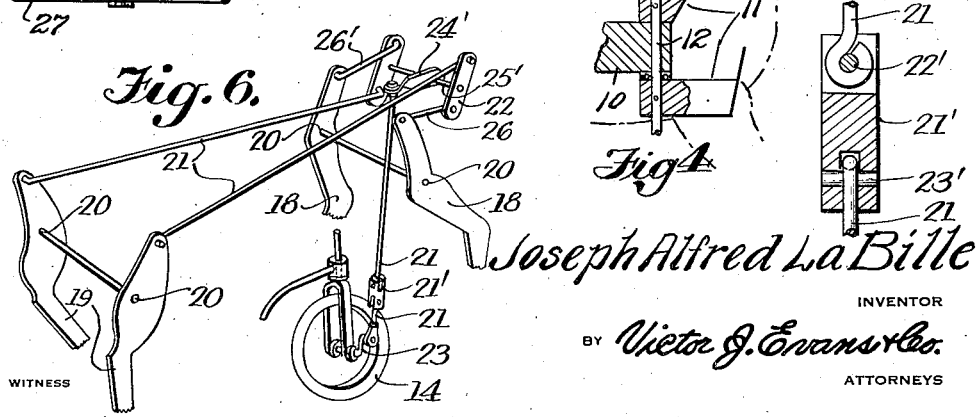
Joseph Alfred LaBille
INVENTOR Patented Sept. 16, 1941

2,256,052

UNITED STATES PATENT OFFICE 2,256,052

VELOCIPEDE

Joseph Alfred La Bille, Chicago, Ill.

Application December 20, 1939, Serial No. 310,241

4 Claims. (Cl. 280—1.15)

The invention relates to an animative horse and carriage effect tricycle and more especially to velocipedes.

The primary object of the invention is the provision of a vehicular device of this character wherein the same is constructed to be imitative of an animated animal, for example, a horse, hitched to a vehicle, for example, a two-wheeled type of carriage so that the device will not only be a riding type of vehicle but will also lend amusement and attractiveness in the use thereof in that the said device will be driven by pedal-operated chain and sprocket connections with power wheels and at the same time motion will be imparted to the legs of the animal and also to the head and neck of such animal to render the same lifelike in the use of the device.

Another object of the invention is the provision of a device of this character wherein the same is stored in a novel manner and the steering is had by the turning of the head of the animative animal image while the legs and feet of such image become active on the advancement of the device to make it appear as if the vehicle part thereof is being drawn by such image.

A further object of the invention is the provision of a device of this character, which is simple in its construction, thoroughly reliable and efficient in operation, assuring safety to the rider, being steered in a novel manner, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is a side elevation of the device constructed in accordance with the invention.

Figure 2 is a top plan view thereof showing by full lines the normal position of the head of the image and by dotted lines an adjusted position of the same resultant from the steering of the device.

Figure 3 is a fragmentary vertical transverse sectional view through the device.

Figure 4 is a fragmentary vertical longitudinal sectional view through the device.

Figure 5 is a detail sectional view through a coupling of the steering mechanism of the device.

Figure 6 is a fragmentary perspective view of the link and leverage connections between the steering wheel and the legs of the image.

Similar reference characters indicate corresponding parts throughout the several views in the drawing.

Referring to the drawing in detail, A designates generally the combination horse and carriage amusement device or velocipede which involves an animated image B and a vehicular equipment C, respectively, these being hereinafter fully described.

The image B comprises a sectional body frame, the sections being denoted at 10 and 11, respectively, and the latter is turnable with respect to the section 10, this being had through the medium of a vertically disposed pivot stem 12 of a steering wheel fork 13 in which is journaled a front steering wheel 14. The pivot stem has fixed thereto the section 11 and is turnable in the front or forward end of the section 10.

The sections 10 and 11 are interiorly of and have built about the same an image body 15, in this instance representation of a horse, and such body includes a flexible neck portion 16 made from suitable flexible material joined with the head 17 while pivotally associated with the body 15 are movable front and rear legs 18 and 19, respectively, the pivots therefor being indicated at 20. These legs 18 and 19 are actuated to simulate trotting activity and such movement is imparted thereto through pivoted link and leverage connections 21 and 22, respectively, between the same and a crank 23 which is a part of the axle for the front steering wheel 14. The lever connection 21 is made in two parts and joined together by the link 21'. The ends of the link are bifurcated and into which extend the ends of the two sections of the lever and are held therein by the pivots 22' and 23', extending at right angles to each other.

The upper end of the rod 21 passes loosely through the arm 24' so that it may readily turn and yet be held against longitudinal movement. This arm 24' is rigidly mounted on the shaft 25' of the pivoted links 22. The links 22 are connected to the upper ends of the front legs 18 by means of rods 26'. The vehicular part C comprises a frame 24 having its fore end 25 fitting the stem 12 of the front fork 13 for the steering wheel 14 while the aft end of this frame 24 has journaled therein the power axle 26 carrying a pair of rear traction wheels 27, one being fixed to the said axle 26 and constitutes the power or driving wheel of the device.

The frame 24 is equipped with foot pedals 28 which through sprocket wheel and sprocket chain connections 29 and 30, respectively, operate or drive the rear axle 26 and the power wheel fixed thereto. In this manner the device is driven.

Rising appropriately from the frame 24 is a support 31 for a seat 32 and this support has connection with the body 15 and its frame 10, being imitative of the shafts of a vehicle and the horse image hitched therein.

Pivoted to the head 17 for vertical swinging movement is a steering yoke 33 imitative of the driving reins of harness and this yoke is extended rearwardly in the direction of the seat 32 to be convenient for operation by an occupant or rider of the seat so that the device can be readily handled for the steering thereof in that the head 17 is manually turned with the neck 16 which swings the section 11 transferring turning motion to the stem 12 of the fork 13 resulting in the guiding of the vehicle through its steering wheel 14 in the desired direction when the vehicular part C is advanced or on reverse travel thereof.

Rising from the frame 24 is a rest 34, which is imitative of the dash board of a vehicle, and permits of the placing of the yoke 33 thereon for the support of the same when not grasped by the hands of an operator of the vehicle or a person occupying the seat 32.

As has been stated heretofore, the device is operated through pedal action and the travel thereof imparts activity to the legs 18 and 19 of the image while the said device is steered through manipulation of the yoke 33, the head 17 being turned for this purpose and the flexibility of the neck 16 does not retard or interfere with the turning of the head 17 of the image, which, as stated, is imitative of a horse. The motion of the head 17 and the legs 18 and 19 of the image effects a lifelike or animated characteristic thereto.

What is claimed is:

1. A velocipede comprising a sectional body frame, a steering fork connecting the sections of said frame together and turnable by one of said sections, an image built about said frame and having movable legs and a flexible neck, the latter movable with the turnable section, a wheeled vehicular part connected with the steering fork, a steering wheel journaled in said fork, and means operated by the steering wheel for imparting motion to the said legs.

2. A velocipede comprising a sectional body frame, a steering fork connecting the sections of said frame together and turnable by one of said sections, an image built about said frame and having movable legs and a flexible neck, the latter movable with the turnable section, a wheeled vehicular part connected with the steering fork, a steering wheel journaled in said fork, means operated by the steering wheel for imparting motion to the said legs, and manually driven connections for one of the wheels of the vehicular part.

3. A velocipede comprising a sectional body frame, a steering fork connecting the sections of said frame together and turnable by one of said sections, an image built about said frame and having movable legs and a flexible neck, the latter movable with the turnable section, a wheeled vehicular part connected with the steering fork, a steering wheel journaled in said fork, means operated by the steering wheel for imparting motion to the said legs, manually driven connections for one of the wheels of the vehicular part, and a steering yoke for turning the section of said frame having the flexible neck built therewith.

4. A velocipede comprising a sectional body frame, a steering fork connecting the sections of said frame together and turnable by one of said sections, an image built about said frame and having movable legs and a flexible neck, the latter movable with the turnable section, a wheeled vehicular part connected with the steering fork, a steering wheel journaled in said fork, means operated by the steering wheel for imparting motion to the said legs, manually driven connections for one of the wheels of the vehicular part, a steering yoke for turning the section of said frame having the flexible neck built therewith, and a rest included with said vehicular part for the steering yoke.

JOSEPH ALFRED LA BILLE.